United States Patent
Naschberger et al.

(10) Patent No.: US 10,888,930 B2
(45) Date of Patent: Jan. 12, 2021

(54) PISTON GROOVE MACHINING TOOL

(71) Applicant: INNIO Jenbacher GmbH & Co OG, Jenbach (AT)

(72) Inventors: Manuel Naschberger, Tyrol (AT); Patrick Hotter, Tyrol (AT)

(73) Assignee: INNIO Jenbacher GmbH & Co OG, Jenbach (AT)

( * ) Notice: Subject to any disclaimer, the term of this patent is extended or adjusted under 35 U.S.C. 154(b) by 0 days.

(21) Appl. No.: 16/312,313

(22) PCT Filed: Jul. 7, 2017

(86) PCT No.: PCT/EP2017/067084
§ 371 (c)(1),
(2) Date: Dec. 21, 2018

(87) PCT Pub. No.: WO2018/007584
PCT Pub. Date: Jan. 11, 2018

(65) Prior Publication Data
US 2019/0232376 A1 Aug. 1, 2019

(30) Foreign Application Priority Data
Jul. 7, 2016 (AT) .................................. 50605/2016

(51) Int. Cl.
*B23C 5/00* (2006.01)
*B23B 3/24* (2006.01)
(Continued)

(52) U.S. Cl.
CPC .................. *B23B 3/24* (2013.01); *B23D 5/00* (2013.01); *B23D 79/04* (2013.01)

(58) Field of Classification Search
CPC .. B24B 23/00; B23B 5/00; B23B 3/24; B23B 3/22; F02B 77/04; B23D 79/04; Y10T 84/23
See application file for complete search history.

(56) References Cited

U.S. PATENT DOCUMENTS

| 1,346,838 A | * | 7/1920 | Muller ...................... B23B 5/00 |
| | | | 82/114 |
| 1,351,057 A | * | 8/1920 | Munger .................... B23B 5/00 |
| | | | 82/114 |

(Continued)

OTHER PUBLICATIONS

Austrian Search Report and Written Opinion dated Feb. 2, 2017 which was issued in connection with AT50605/2016 which was filed on Jul. 7, 2016.

(Continued)

*Primary Examiner* — Sara Addisu
(74) *Attorney, Agent, or Firm* — Fletcher Yoder, P.C.

(57) ABSTRACT

A tool for machining a groove of a rotation-symmetric component, preferably a piston of an internal combustion engine, is provided. The machining is carried out by a rotation of the tool around an axis of symmetry of the rotation-symmetric component to be machined. The tool includes at least one arm disposed in such a way that a circumference of the rotation-symmetric component can at least be partially enclosed. Also, a machining device for machining of the groove is provided on the at least one arm. At least one adjusting device is provided to adjust a contact force of the at least one machining device on the rotation-symmetric component, and to adapt the tool to different diameters of the rotation-symmetric component.

17 Claims, 5 Drawing Sheets

(51) Int. Cl.
    *B23D 5/00* (2006.01)
    *B23D 79/04* (2006.01)

(56) References Cited

U.S. PATENT DOCUMENTS

| | | | | |
|---|---|---|---|---|
| 1,397,312 | A | | 11/1921 | Bowman |
| 1,491,847 | A | * | 4/1924 | Cleveland ................. B23B 5/00 82/114 |
| 1,650,160 | A | * | 11/1927 | Slack ........................ B23B 5/00 82/114 |
| 1,654,851 | A | * | 1/1928 | Homers .................. F02B 77/04 15/104.012 |
| 1,715,289 | A | | 5/1929 | Hellman |
| 1,820,792 | A | | 8/1931 | Funchess |
| 1,821,891 | A | * | 9/1931 | Jones ...................... F02B 77/04 15/104.012 |
| 2,018,930 | A | | 10/1935 | Stromgren |
| 2,109,857 | A | | 3/1938 | Berkman |
| 2,124,757 | A | | 7/1938 | Vaughan |
| 2,194,686 | A | * | 3/1940 | Berggren ................. B23B 5/00 82/114 |
| 2,344,880 | A | | 3/1944 | Crow |
| 2,480,456 | A | | 8/1949 | Houston |
| 2,566,048 | A | * | 8/1951 | Wetzel ..................... B23B 5/00 82/114 |
| 2,570,416 | A | | 10/1951 | Wittman |
| 2,695,542 | A | * | 11/1954 | Ward ........................ B23B 5/00 82/128 |
| 3,188,670 | A | | 6/1965 | Babb |
| 3,299,751 | A | * | 1/1967 | Coninx .................... B23B 5/00 82/114 |
| 3,323,161 | A | | 6/1967 | Kyser |
| 3,510,902 | A | | 5/1970 | Kyser |
| 3,712,099 | A | * | 1/1973 | Elsbett ................... B21H 7/182 72/107 |
| 4,079,477 | A | | 3/1978 | Helt |

OTHER PUBLICATIONS

International Search Report and Written Opinion dated Oct. 6, 2017 which was issued in connection with PCT/EP2017/067084 which was filed on Jul. 7, 2017.

* cited by examiner

PISTON GROOVE MACHINING TOOL

TECHNOLOGY FIELD

The disclosure relates to a tool for machining a groove of a rotation-symmetric component, such as a piston of an internal combustion engine.

BACKGROUND OF THE DISCLOSURE

A tool for machining a groove of a rotation-symmetric component is sometimes an essential aid in maintenance work of an internal combustion engine. The emphasis here is on easy handling and high quality of machining.

An exemplary tool is disclosed in U.S. Pat. No. 3,188,670. Here, a pincer-like tool, which comprises two arms, is placed over a piston to be machined and is placed in its groove with a machining element. A machining element for cleaning the groove is disposed on one arm, and a guiding device on the other arm for securing the position during the machining. The contact force of the machining element on the piston is thereby achieved in an undefined manner by a manual pressing together of the arms to one another.

The drawback of tools for machining a groove of a piston known from the prior art is that such a class-specific tool provides only very little variability in relation to the diameter of a rotation-symmetric component. Furthermore, a defined setting of the contact force/machining force is not possible, since it is usually applied by manual pressing.

SUMMARY OF THE DISCLOSURE

Task of the disclosure is to provide a class-specific tool to ensure an enhanced ability for machining a groove of a rotation-symmetric component.

This task is solved with a tool having at least one arm with a mechining device and at least one adjusting device, wherein the at least one adjusting device is configured to adjust a contact force of the at least one machining device on the rotation-symmetric component, and adapt the tool to different diameters of the rotation-symmetric component.

It ensures a constant and precisely defined contact force across the entire area to be machined, which results in a high quality of the work result. Because a tool according to the disclosure can be adapted to different diameters by means of an adjusting device, there is no longer a need to resort to a plurality of tools to be able to machine different components (in relation to their diameter).

It can be provided that at least one machining device is designed as a cutting tool. A cutting tool is mostly used in this context to clean or rework a groove of a rotation-symmetric component. Especially in maintenance work of pistons, which already had exposure to the operating conditions, this is often required, to eliminate impurities (such as soot) or slight damage to the edges of the groove.

It can be provided that a width of the at least one cutting tool is modifiable in a direction perpendicular to the extent of the at least one arm and parallel to a diameter of the at least one arm. Such a variability with respect to the width of a groove to be machined creates on the one hand the opportunity to carry out the machining in several steps in case of heavy dirt or damage, thereby approaching the final dimensions step by step, and on the other hand a degree of flexibility for machining different components with different widths is attained.

It can be provided that the at least one cutting tool is attached interchangeably. With the help of such an arrangement it is ensured that the cutting tool can be replaced quickly and easily, if due to wear or damage on the cutting tool the desired quality of the machining can no longer be achieved.

It is provided that the at least one machining device is designed as an abrasive element. High accuracies and surface qualities can be achieved by machining a groove with an abrasive element. Such machining can be done, for example, after machining with a cutting tool.

It can be provided that a width of the at least one abrasive element is modifiable in a direction perpendicular to the extent of the at least one arm and parallel to a diameter of the at least one arm.

It can be provided that the at least one abrasive element is disposed interchangeably.

It is provided that the at least one machining device is disposed in such a way that a groove base of a groove is machinable.

It can be provided that the at least one machining device is disposed in such a way that the at least one groove flank of a groove is machinable.

It can be provided that the at least one machining device is capable of specifically being tilted to a sloping position. Such tilting of the machining device to a sloping position ensures a machinability of slopped grooves (grooves which have an angular position or an angular position of the groove flanks).

It can be provided that a guiding device to guide the tool on the groove is provided on at least one arm.

It is provided that guiding elements of the guiding device are designed to allow a rotation of the tool around the rotation-symmetric component to be machined, but ensure a particular position in axial direction.

It can be provided that the guiding device is disposed interchangeably.

It can be provided that the guiding device is modifiable in its width.

A first arm and a second arm are provided.

It can be provided that on the first arm the at least one machining device is provided and that on the second arm the guiding device for the guiding of the tool is provided.

BRIEF DESCRIPTION OF THE DRAWINGS

Exemplary embodiments of the disclosure are discussed with reference to the Figures. The drawings in detail.

DETAILED DESCRIPTION

In the figures shown, the rotation-symmetric component to be machined is designed in an exemplary manner as piston 17 with at least one piston groove 18 to be cleaned.

Figure 1:
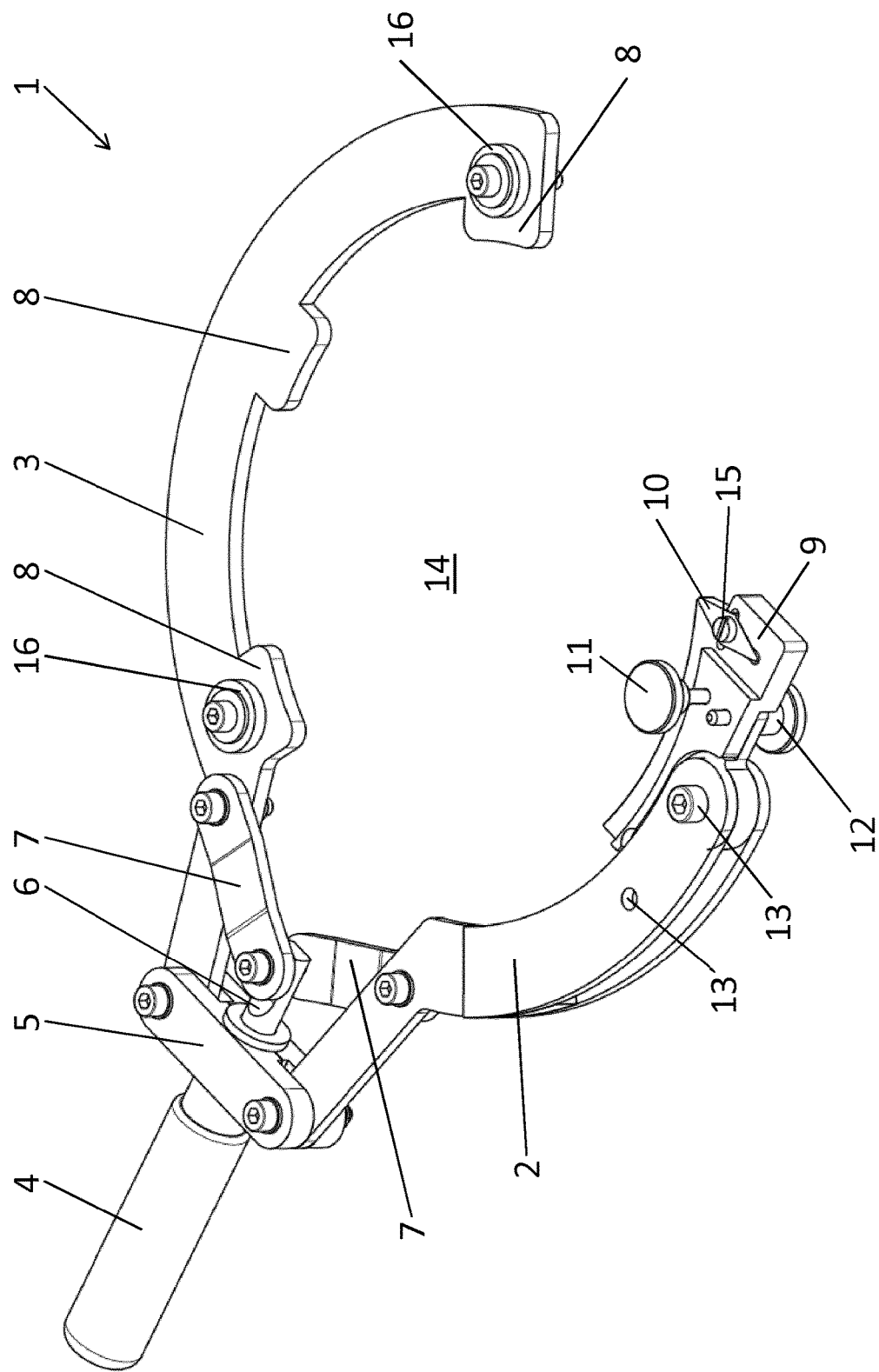
FIG. 1 shows a tool according to the disclosure in perspective view.

FIG. 1 shows a perspective view of an exemplary embodiment of a tool 1 with a first arm 2 and a second arm 3 and a handle 4 according to the disclosure. For the machining of a piston groove 18 of a piston 17 (see FIG. 2) the tool 1 is manually guided by means of the handle 4 once or several times around the piston 17.

On the first arm 2 (in the area of the free end of the first arm 2), a holder 9 is detachably mounted by the fastening element 13, which in the state shown carries a cutting tool 10 (hereinafter referred to as "cutting blade") for the machining of the groove flanks of a selected piston groove 18 of a piston 17.

A guiding device is disposed on the second arm 2, which is here designed in the form of three guiding elements 8 distributed over the length of the second arm 2 and two guide rollers 16 disposed at the ends of the second arm 2.

Figure 2:
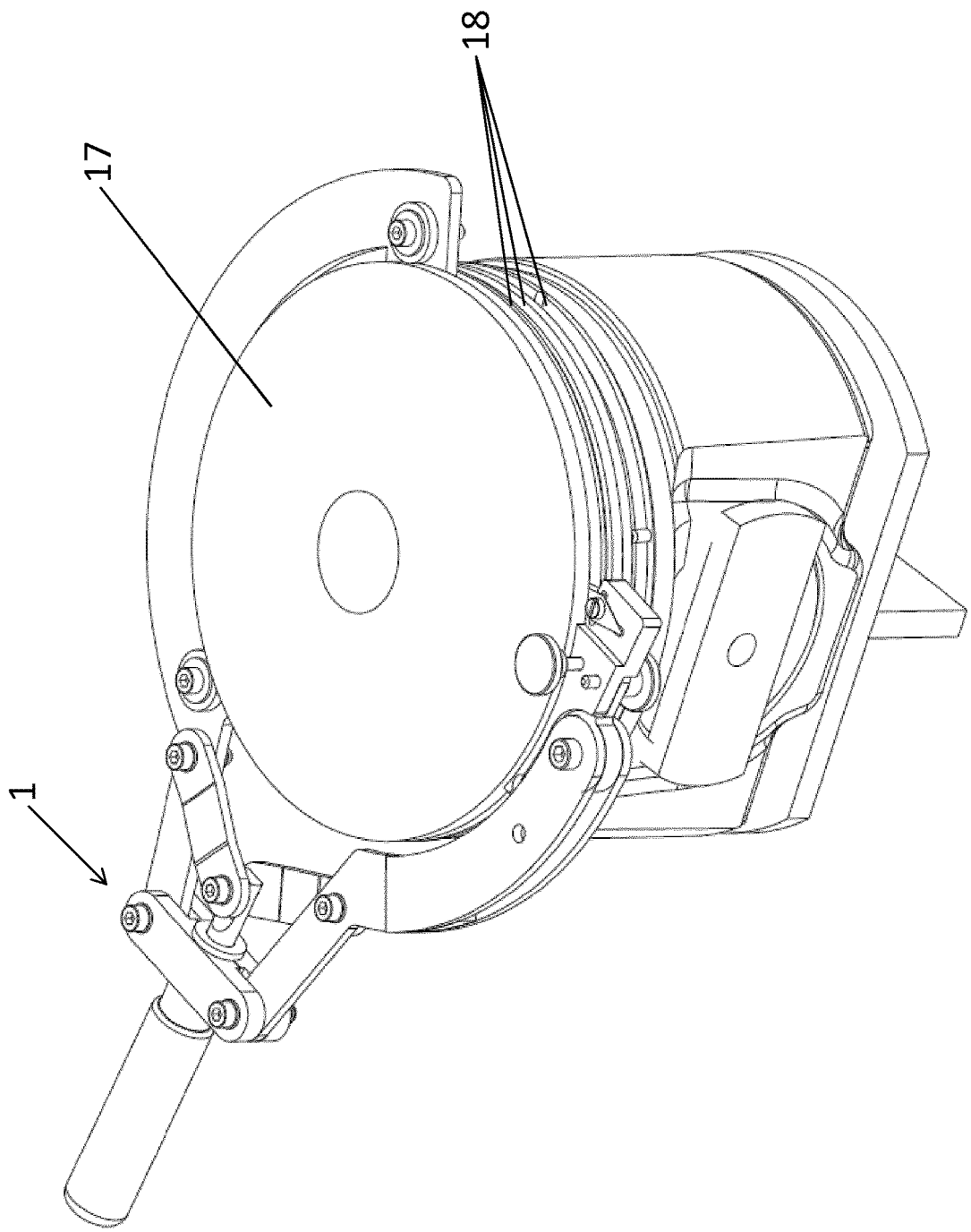
FIG. 2 shows the tool of FIG. 1 in a position that is applied to a piston.

Between the first arm 2 and the second arm 3 is a gap 14 designed for positioning of the rotation-symmetric component to be machined (here a piston 17—see FIG. 2). An adjusting device is provided for adaption of tool 1 to different diameters of the rotation-symmetric component, which in the shown exemplary embodiment can change the swivel position of the first arm 2 and of the second arm 3 relative to each other. A knee lever with two lever arms 7 is provided for this purpose, where each lever arm 7 is connected at one end with one arm 2, 3 of the tool 1 and is connected on the other end (knee) to a spindle 6. A linear movement of the spindle 6 in the shown exemplary embodiment can occur via the rotatable disposed handle 4 on the bearing 5. If the spindle 6 moves further out of the bearing 5, this increases the diameter of the gap 14 for positioning of the rotation-symmetric component to be machined. If the spindle 6 moves further into the bearing 5, this decreases the diameter of the gap 14 for positioning of the rotation-symmetric component to be machined.

The holder 9 in FIG. 1, which is detachably mounted by the fastening element 13 on the first arm 2 (which can be swiveled around an axis formed by the fastening element 13), comprises an adjusting device by means of which the contact force of the cutting blade 10 for the machining of the groove flanks, with which it is pressed against the groove flanks of the piston grooves 18, can be selected. The adjusting device consists of a first and a second half shell 19, 20 of the holder 9 for the cutting blade 10 for the machining of the groove flanks (see also FIG. 4), whose distance to one another can be adjusted by a first control element 11 and locked by a second control element 12. The adjustment is carried out so as to achieve a larger contact force, the distance between the first and second half shell 19, 20 is increased. To achieve a smaller contact force, the distance between the first and second half shell 19, 20 is decreased.

To change the cutting blade 10 for the machining of the groove flanks (which is designed here as a rotating cutting blade), the fixing element 15, designed here as a screw, is loosened and the cutting blade 10 for the machining of the groove flanks is removed and, as appropriate, re-inserted in turned position. Of course, an exchange of the cutting blade 10 for the machining of the groove flanks can also be done. A removal of the holder 9 from the first arm 2 is not required.

The guide rollers 16 of the guiding device disposed on the second arm 3 facilitate guiding the tool 1 around the piston and limit the insertion depth of the guide elements 8 into the piston groove 18.

Figure 3:
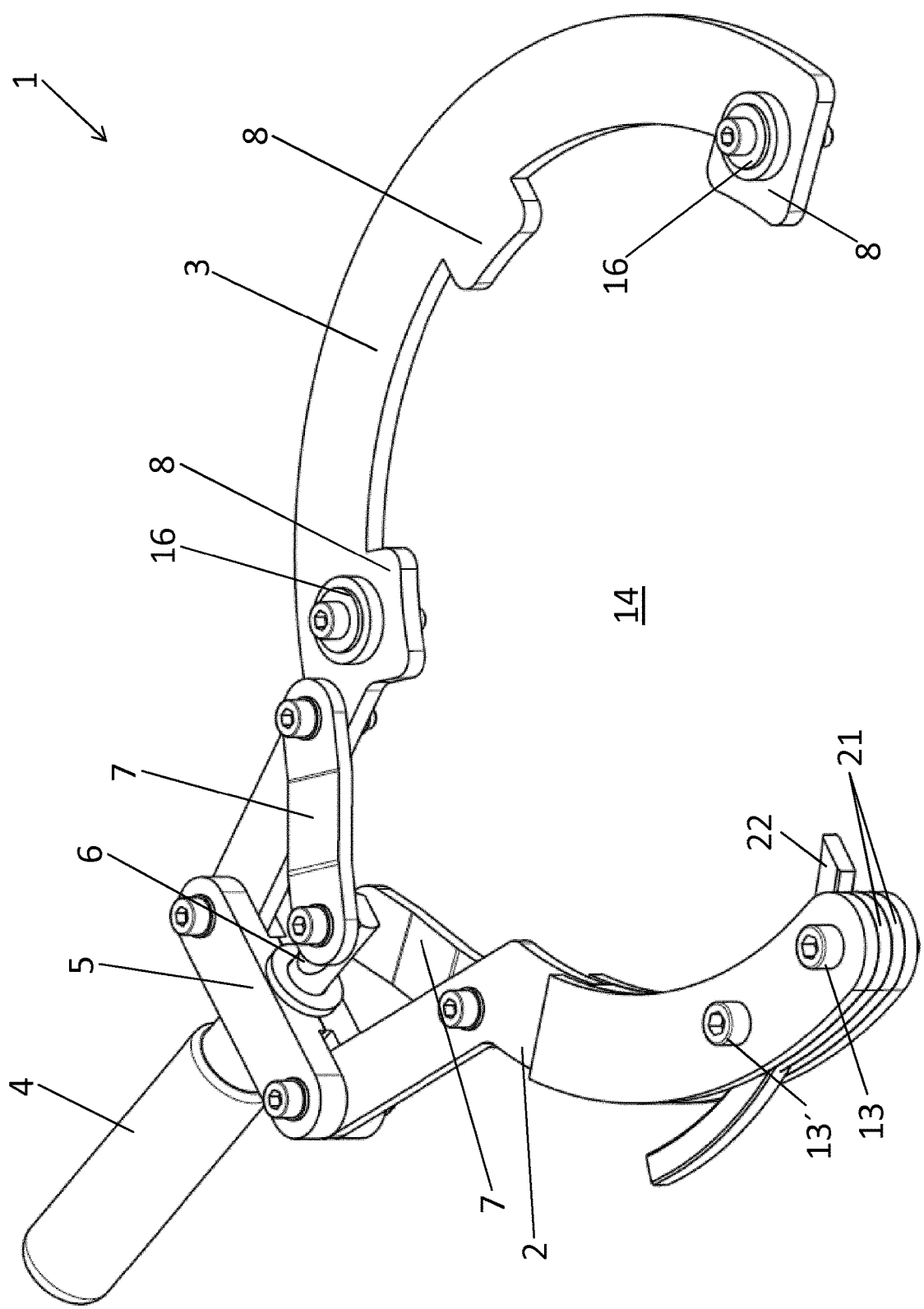
FIG. 3 shows the tool of FIG. 1.

FIG. 3 shows the tool 1 shown in FIG. 1, wherein the holder 9 for the cutting blade 10 together with the cutting blade 10 for the machining of the groove flanks has been removed and wherein a cutting blade 22 for machining a groove base of the piston groove 18 was mounted instead. It is detachably fixed between two clamping jaws 21. The contact force, with which the cutting blade 22 is pressed against the groove base for machining a groove base, can be adjusted via the handle 4. A higher contact force results when the first and second arms 2, 3 are moved towards one another. A lower contact pressure results when the first and second arms 2, 3 are moved away from one another.

Figure 4:
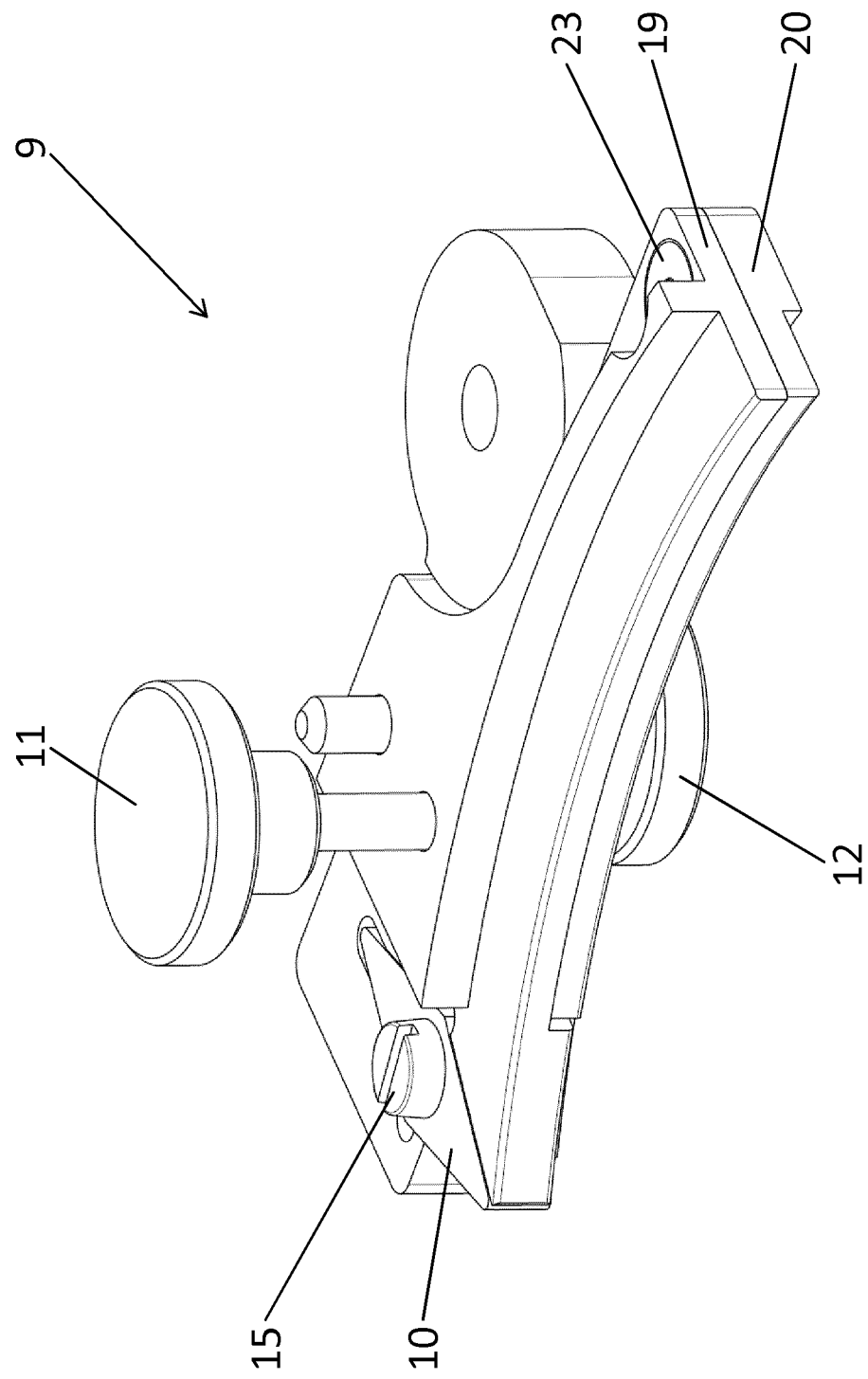
FIG. 4 shows the holder together with the cutting blade for the groove flanks in isolation.

FIG. 4 shows the holder 9 for the cutting blade 10 for the groove flanks together with the cutting blade 10 in isolation. It is clearly visible that (as already described for FIG. 1) the adjusting device consists of a first and a second half shell 19, 20, which are connected to each other by a fixing element 23. For the machining of the groove flanks, the distance between the half shells 19, 20 relative to one another can be adjusted by the first control element 11 and locked by the second control element 12. In order to detachably dispose the cutting blade 10 on the first half shell 19, in this exemplary embodiment the fixing element 15 for the cutting blade 10 is designed as a screw. It should be noted that the first control element 11 of the adjusting device for the contact force and the second control element 12 for the locking comprise an offset relative to one another. Due to this geometrical situation, it is possible to adjust an angular position of the half shells 19, 20 relative to each other. This makes it possible to machine groove flanks that are disposed at a slopped angle.

Figure 5:
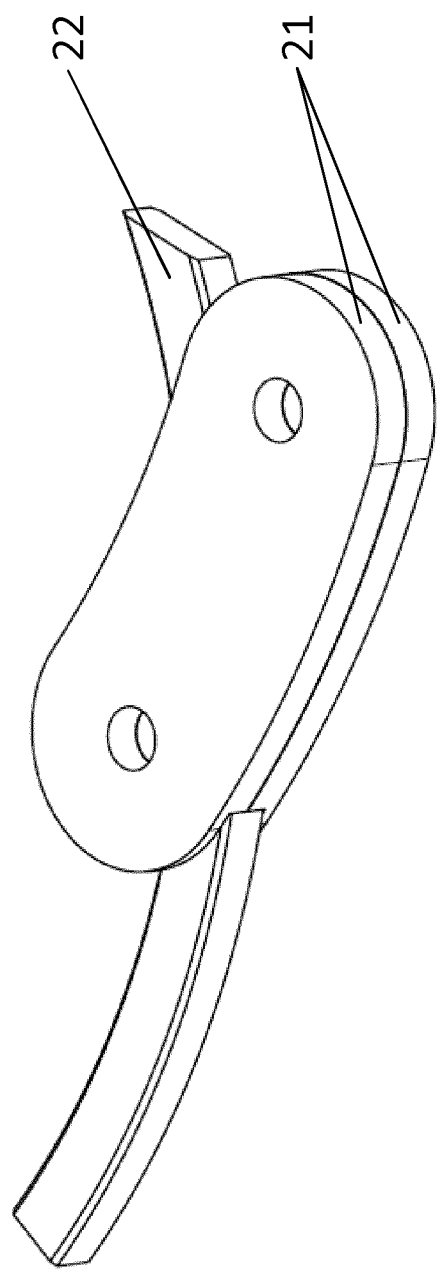
FIG. 5 shows the holder together with the cutting blade for the groove base in isolation.

FIG. 5 shows the holder of the cutting blade 22 for the groove base together with the cutting blade 22 in isolation. Here, it is clearly visible how the cutting blade 22 for machining of the groove base is fastened by the clamping between the clamping jaws 21.

It is also possible, in the case of a tool 1 according to the disclosure, to develop further holders for holding other machining tools. Here, reference is made, by way of example, to a holder for an abrasive element for fine machining.

What we claim is:

1. A tool for machining a groove of a rotation-symmetric component, comprising a piston of an internal combustion engine, wherein the machining is carried out by a rotation of the tool around an axis of symmetry of the rotation-symmetric component to be machined, the tool comprising:
   at least one arm configured to at least partially partially surround a circumference of the rotation-symmetric component;
   a machining device arranged on the at least one arm, wherein the machining device is configured to machine the groove;
   at least one adjusting device, wherein the at least one adjusting device is configured to: adjust a contact force of the at least one machining device on the rotation-symmetric component, and adapt the tool to different diameters of the rotation-symmetric component, wherein the at least one adjusting device comprises a first and a second half shell, wherein a distance between the first and second half shells is adjustable by a first control element and locked by a second control element.

2. The tool according to claim 1, wherein the at least one machining device comprises cutting tool or an abrasive element.

3. The tool according to claim 1, wherein the at least one machining device is configured to move in a direction perpendicular to the extent of the at least one arm and parallel to a diameter of the at least one arm to adjust a width of the at least one machining device relative to a corresponding width of the groove.

4. The tool according to claim 1, wherein the at least one machining device is removably coupled to the at least one arm.

5. The tool according to claim 4, wherein the at least one machining device is removably coupled to a holder having the first and second half shells, and the holder is removably coupled to the at least one arm.

6. The tool according to claim 1, wherein the at least one adjusting device comprises a first adjusting device and a second adjusting device, the first adjusting device is configured to adjust an arm position of the at least one arm relative to a handle, and the second adjusting device comprises the first and second half shells configured to adjust a position of the at least one machining device relative to the at least one arm.

7. The tool according to claim 6, wherein the at least one arm comprises first and second arms, and the first adjusting device is configured to move the first and second arms relative to the handle to adjust a relative distance between the first and second arms.

8. The tool according to claim 7, wherein the first adjusting device comprises:
a spindle coupled to the handle, wherein the handle is configured to rotate to cause the spindle to move along an axial path of travel;
a first lever rotatably coupled to the spindle, wherein the first arm is rotatably coupled to the first lever at a first position, the first arm is rotatably coupled to the handle at a second position, and the first and second positions are offset from one another; and
a second lever rotatably coupled to the spindle, wherein the second arm is rotatably coupled to the second lever at a third position, the second arm is rotatably coupled to the handle at a fourth position, and the third and fourth positions are offset from one another.

9. The tool according to claim 8, wherein the handle comprises a bearing portion extending crosswise to an axis of the handle, the spindle extends through the bearing portion, and the first and second arms are rotatably coupled to the bearing portion at the second and fourth positions.

10. The tool according to claim 1, wherein the first and second control elements are offset relative to each other, wherein an angular position between the first and second half shells is adjustable to tilt the at least one machining device to a sloping position.

11. The tool according to claim 1, wherein the at least one arm comprises a guiding device configured to guide the tool along the groove.

12. The tool according to claim 11, wherein the guiding device comprises one or more guiding elements configured to extend into the groove, one or more guide rollers configured to roll along the circumference of the rotation-symmetric component, or a combination thereof.

13. The tool according to claim 11, wherein the at least one arm comprises first and second arms, the at least one machining device is provided on the first arm, and the guiding device is provided on the second arm.

14. A tool for machining a groove of a rotation-symmetric component comprising a piston of an internal combustion engine, wherein the machining is carried out by a rotation of the tool around an axis of symmetry of the rotation-symmetric component to be machined, wherein the tool comprises:
a first arm configured to at least partially surround a circumference of the rotation-symmetric component;
a holder coupled to the first arm, wherein the holder is configured to hold a machining device; and
at least one adjuster configured to adjust a contact force of the machining device on the rotation-symmetric component, and adapt the tool to different diameters of the rotation-symmetric component, wherein the at least one adjuster comprises a first half shell and a second half shell, wherein a distance between the first and second half shells is adjustable by a first control element and locked by a second control element.

15. The tool according to claim 14, wherein the at least one adjuster comprises a first adjuster and a second adjuster, the first adjuster is configured to adjust an arm position of the first arm relative to a handle and/or a second arm, and the second adjuster comprises the first and second half shells configured to adjust a position of the machining device relative to the first arm.

16. The tool according to claim 15, comprising the second arm, wherein the first adjuster is configured to move the first and second arms relative to the handle to adjust a relative distance between the first and second arms.

17. The tool according to claim 16, wherein the first adjuster comprises:
a spindle coupled to the handle, wherein the handle is configured to rotate to cause the spindle to move along an axial path of travel;
a first lever rotatably coupled to the spindle, wherein the first arm is rotatably coupled to the first lever at a first position, the first arm is rotatably coupled to the handle at a second position, and the first and second positions are offset from one another; and
a second lever rotatably coupled to the spindle, wherein the second arm is rotatably coupled to the second lever at a third position, the second arm is rotatably coupled to the handle at a fourth position, and the third and fourth positions are offset from one another.

* * * * *